(12) United States Patent
Shibano

(10) Patent No.: US 8,098,453 B2
(45) Date of Patent: Jan. 17, 2012

(54) MAGNETIC STORAGE MEDIUM AND STORAGE APPARATUS

(75) Inventor: Motomichi Shibano, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 263 days.

(21) Appl. No.: 12/488,082

(22) Filed: Jun. 19, 2009

(65) Prior Publication Data

US 2010/0053814 A1 Mar. 4, 2010

(30) Foreign Application Priority Data

Aug. 29, 2008 (JP) ................. 2008-221758

(51) Int. Cl.
*G11B 5/596* (2006.01)
(52) U.S. Cl. .................................... 360/77.08
(58) Field of Classification Search ............... 360/77.08, 360/75, 77.02
See application file for complete search history.

(56) References Cited

U.S. PATENT DOCUMENTS

| 4,549,232 | A | 10/1985 | Axmear et al. |
| 6,476,989 | B1 | 11/2002 | Chainer et al. |
| 7,355,810 | B2 * | 4/2008 | Asakura ............... 360/77.08 |

FOREIGN PATENT DOCUMENTS

| JP | A 60-10472 | 1/1985 |
| JP | A 10-69742 | 3/1998 |

* cited by examiner

*Primary Examiner* — Fred Tzeng
(74) *Attorney, Agent, or Firm* — Greer, Burns & Crain, Ltd

(57) ABSTRACT

A magnetic storage medium includes: burst lines each including magnetic bodies placed in a nonmagnetic body in a predetermined repetitive pattern repeated in the radial direction, the burst lines arranged in the circumferential direction at predetermined intervals, wherein the phases of the predetermined repetitive patterns are shifted in the radial direction relative to a circumferential line at least between the adjacent ones of the burst lines.

8 Claims, 10 Drawing Sheets

MAGNETIC STORAGE MEDIUM AND STORAGE APPARATUS

CROSS-REFERENCE TO RELATED APPLICATION

This application is based upon and claims the benefit of priority from the prior Japanese Patent Application No. 2008-221758 filed on Aug. 29, 2008, the entire contents of which are incorporated herein by reference.

FIELD

The embodiments discussed herein are related to a storage apparatus such as a hard disk drive, for example. The embodiments discussed herein are also related to a storage medium incorporated in the storage apparatus.

BACKGROUND

A bit patterned medium is well known. The bit patterned medium allows recordation of bit data in each of magnetic dots arranged in a nonmagnetic body. Photolithography is utilized to establish the magnetic dots. A photoresist is subjected to exposure on the disk-shaped substrate. Electron beam is utilized to expose the photoresist. The electron beam is intermittently applied in accordance with predetermined clock signals. The sequence of beam spots realizes the exposure of the photoresist. The electron beam lithography allows exposure for every beam spot. The magnetic dots are formed based on a set of the beam spots.

Burst patterns made of magnetic dots are well known. The burst patterns are arranged at predetermined intervals in the circumferential direction. The individual burst pattern includes magnetic dots arranged in a nonmagnetic body in a predetermined repetitive pattern repeated in the radial direction. The phases of the repetitive patterns are synchronized with one another for all the burst patterns. This results in alignment of the intervals between the magnetic dots in the burst patterns on an arbitrary circumferential line. A magnetic head cannot output a read signal having a sufficient intensity above the circumferential line. The tracking servo control of the magnetic head cannot be performed with a sufficient accuracy.

SUMMARY

According to a first aspect of the invention, a magnetic storage medium includes: burst lines each including magnetic bodies placed in a nonmagnetic body in a predetermined repetitive pattern repeated in the radial direction, the burst lines arranged in the circumferential direction at predetermined intervals, wherein the phases of the predetermined repetitive patterns are shifted in the radial direction relative to a circumferential line at least between the adjacent ones of the burst lines.

According to a second aspect of the invention, a magnetic storage medium includes: a first magnetic block section made of a unit magnetic body contoured to have a predetermined shape in a nonmagnetic body; and a second magnetic block section made of the unit magnetic body shifted from the first magnetic block section in the radial direction by a predetermined amount, wherein the first magnetic block section and the second magnetic block section are alternately arranged in series in the circumferential direction.

The object and advantages of the embodiment will be realized and attained by means of the elements and combinations particularly pointed out in the appended claims. It is to be understood that both the foregoing general description and the following detailed description are exemplary and explanatory and are not restrictive of the embodiment, as claimed.

DESCRIPTION OF EMBODIMENT

Embodiments of the present invention will be explained below with reference to the accompanying drawings.

Figure 1:
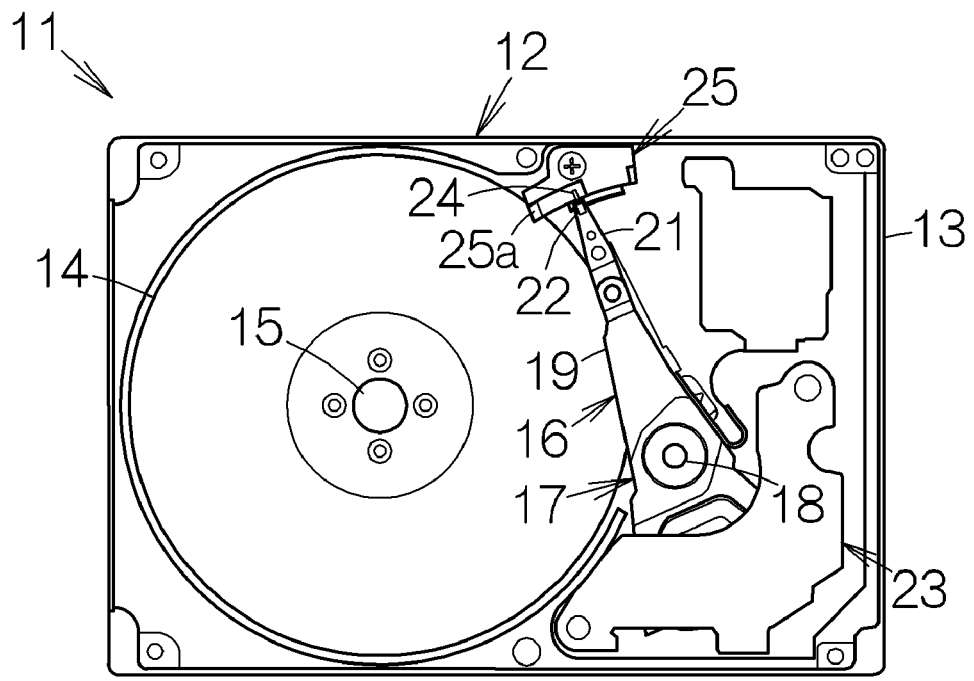
FIG. 1 is a plan view schematically illustrating the structure of a hard disk drive, HDD, as a specific example of a storage apparatus.

FIG. 1 schematically illustrates the structure of a hard disk drive, HDD, 11 as an example of a storage medium drive or storage apparatus. The hard disk drive 11 includes an enclosure 12. The enclosure 12 includes a box-shaped enclosure base and an enclosure cover, not illustrated. The box-shaped enclosure base 13 defines an inner space in the shape of a flat parallelepiped, for example. The box-shaped enclosure base 13 may be made of a metallic material such as aluminum (Al), for example. Casting process may be employed to form the box-shaped enclosure base 13. The enclosure cover is coupled to the box-shaped enclosure base 13. The enclosure cover closes the opening of the box-shaped enclosure base 13. Pressing process may be employed to form the enclosure cover out of a plate material, for example.

At least one magnetic recording disk 14 as a storage medium is placed in the inner space of the box-shaped enclosure base 13. The magnetic recording disk or disks 14 are mounted on the spindle shaft of a spindle motor 15. The spindle motor 15 drives the magnetic recording disk or disks 14 for rotation at a higher revolution speed such as 5,400 rpm, 7,200 rpm, 10,000 rpm, 15,000 rmp, or the like. The magnetic recording disk 14 is a so-called perpendicular magnetic recording medium, as described later in detail.

A carriage 16 is also placed in the inner space of the box-shaped enclosure base 13. The carriage 16 includes a carriage block 17. The carriage block 17 is coupled to a vertical pivotal shaft 18 for relative rotation. The vertical pivotal shaft 18 stands upright from the bottom plate of the box-shaped enclosure base 13. Carriage arms 19 are defined in the carriage block 17. The carriage arms 19 extend in the horizontal direction from the vertical pivotal shaft 18. The carriage block 17 may be made of aluminum (Al), for example. Extrusion process may be employed to form the carriage block 17, for example.

A head suspension 21 is attached to the front or tip end of the individual carriage arm 19. The head suspension 21 extends forward from the carriage arm 19. A flexure is attached to the head suspension 21. A flying head slider 22 is supported on the flexure. The flexure allows the flying head slider 22 to change its attitude relative to the head suspension 21. A head element, namely an electromagnetic transducer, not illustrated, is mounted on the flying head slider 22.

The electromagnetic transducer includes a write element and a read element, for example. A so-called single pole head is employed as the write element. The single pole head generates a magnetic field with the assistance of a thin film coil pattern. A main magnetic pole serves to apply the magnetic flux to the magnetic recording disk 14 in the perpendicular direction perpendicular to the surface of the magnetic recording disk 14. The magnetic flux is utilized to write binary data into the magnetic recording disk 14. A giant magnetoresistive (GMR) element or a tunnel-junction magnetoresistive (TMR) element is employed as the read element. Variation in the electric resistance is induced in a spin valve film or a tunnel-junction film in response to the inversion of polarization in the magnetic flux applied from the magnetic recording disk 14, for example. The read element discriminates binary data on the magnetic recording disk 14 based on the induced variation in the electric resistance.

When the magnetic recording disk 14 rotates, the flying head slider 22 is allowed to receive airflow generated along the rotating magnetic recording disk 14. The airflow serves to generate a positive pressure or lift as well as a negative pressure on the flying head slider 22. The lift of the flying head slider 22 is balanced with the urging force of the head suspension 21 and the negative pressure so that the flying head slider 22 keeps flying above the surface of the magnetic recording disk 14 at a higher stability during the rotation of the magnetic recording disk 14.

A voice coil motor, VCM, 23 is coupled to the carriage block 17. The voice coil motor 23 serves to drive the carriage block 17 for rotation around the vertical pivotal shaft 18. The rotation of the carriage block 17 allows the carriage arms 19 and the head suspensions 21 to swing. When the individual carriage arm 19 swings around the vertical pivotal shaft 18 during the flight of the flying head slider 22, the flying head slider 22 is allowed to move in the radial direction of the magnetic recording disk 14. The electromagnetic transducer on the flying head slider 22 is thus allowed to cross concentric recording tracks defined between the innermost and outermost recording tracks. The electromagnetic transducer on the flying head slider 22 is in this manner positioned right above a target recording track on the magnetic recording disk 14.

A load tab 24 is attached to the front or tip end of the head suspension 21. The load tab 24 extends forward from tip or front end of the head suspension 21. The load tab 24 is allowed to move in the radial direction of the magnetic recording disk 14 based on the swinging movement of the carriage arm 19. A ramp member 25 is placed outside the outer periphery of the magnetic recording disk 14 on the movement path of the load tab 24. The ramp member 25 is fixed to the base 13. The load tab 24 is received on the ramp member 25. The ramp member 25 may be made of a hard plastic material, for example.

The ramp member 25 includes a ramp 25a extending along the movement path of the load tab 24. The ramp 25a gets farther from an imaginary plane including the surface of the magnetic recording disk 14 as the position gets farther from the rotation axis of the magnetic recording disk 14. When the carriage arm 19 is driven to swing around the vertical pivotal shaft 18 to get farther from the rotation axis of the magnetic recording disk 14, the load tab 24 slides upward on the ramp 25a. The flying head slider 22 is in this manner distanced from the surface of the magnetic recording disk 14 irrespective of the negative pressure generated between the flying head slider 22 and the magnetic recording disk 14. The flying head slider 22 is unloaded into the space outside the outer periphery of the magnetic recording disk 14. When the carriage arm 19 is driven to swing around the vertical pivotal shaft 18 to get closer to the rotation axis of the magnetic recording disk 14, the load tab 24 slides downward along the ramp 25a. The rotating magnetic recording disk 14 serves to generate a lift on the flying head slider 22. The ramp member 25 and the load tab 24 in combination establish a so-called load/unload mechanism.

Figure 2:
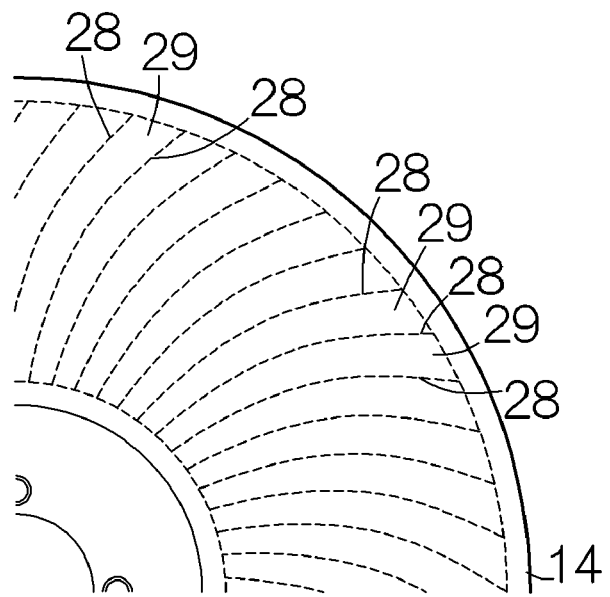
FIG. 2 is an enlarged partial plan view of a magnetic recording disk as a specific example of a storage medium.

As shown in FIG. 2, stripes of bent servo sector areas 28, for example, sixty of those, are defined on the front and back surfaces of the magnetic recording disk 14. The individual servo sector areas 28 extend in the radial direction of the magnetic recording disk 14. Predetermined servo patterns are established in the servo sector areas 28. The electromagnetic transducer on the flying head slider 22 is allowed to read magnetic information out of the servo patterns. The read magnetic information is utilized to position the flying head slider 22 in the radial direction of the magnetic recording disk 14. The curvature of the servo sector area 28 is determined based on the path of movement of the electromagnetic transducer.

Figure 3:
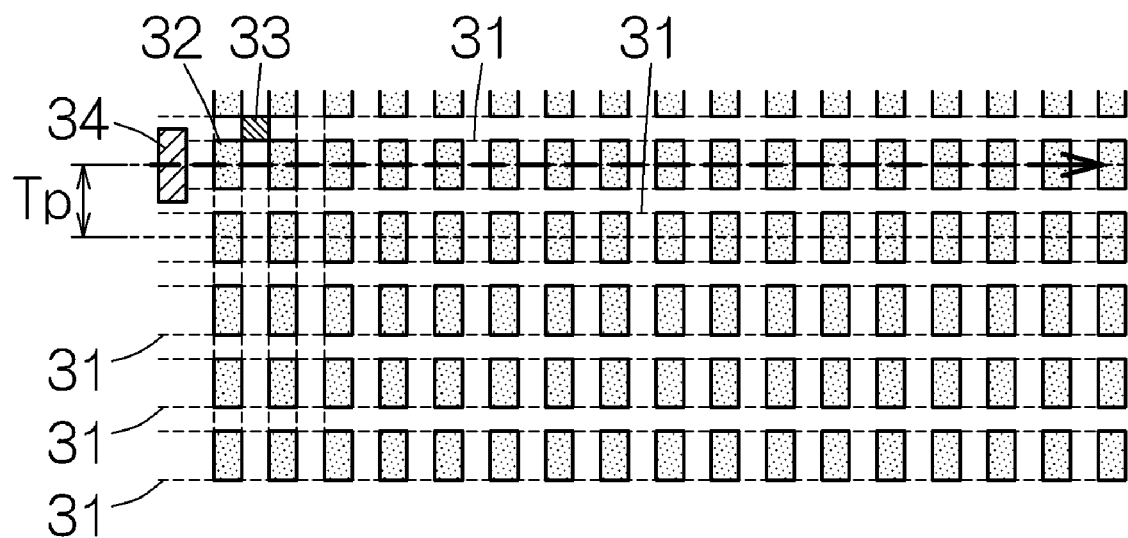
FIG. 3 is an enlarged partial plan view schematically illustrating a data area on the magnetic recording disk.

A data storage area 29 is established between the adjacent ones of the servo sector areas 28 for holding magnetic information or binary data. As depicted in FIG. 3, for example, the data storage area 29 has magnetic dots 32 arranged on individual recording tracks 31. The individual magnetic dot 32 is made of a magnetic body. A nonmagnetic body is located between the adjacent magnetic dots 32 for magnetic isolation of the adjacent magnetic dots 32. Here, unit blocks 33 serve to determine the interval between the adjacent magnetic bodies and the shape of the magnetic bodies. The beam spot of an electron beam determines the extent and size of the unit blocks 33. The individual magnetic dot 32 is covered with two of the unit blocks 33 adjacent to each other in the radial direction of the magnetic recording disk 14. The interval corresponding to one unit block 33 is established between the adjacent magnetic dots 32 on the recording track 31 along the circumferential direction of the magnetic recording disk 14. Likewise, the interval corresponding to one unit block 33 is established between the adjacent recording tracks 31 in the radial direction of the magnetic recording disk 14. An upward or downward magnetization is established at the individual magnetic dot 32. Binary data is discriminated depending on whether the magnetization is set in "the upward direction", exemplified by one of the north and south poles, or "the downward direction", exemplified by the other of the north and south poles. The write element of the electromagnetic transducer is designed to write binary data into the data storage areas 29 along the recording tracks 31. Likewise, the read element 34 is designed to read bit data sequences written in the recording tracks 31 in the data storage areas 29. The smaller the size of the magnetic dots 32 gets, the better magnetization characteristics the individual magnetic dot 32 is allowed to enjoy. Here, the interval between the centerlines of the adjacent recording tracks 31, namely a track pitch (Tp), corresponds to three unit blocks 33.

Figure 4:
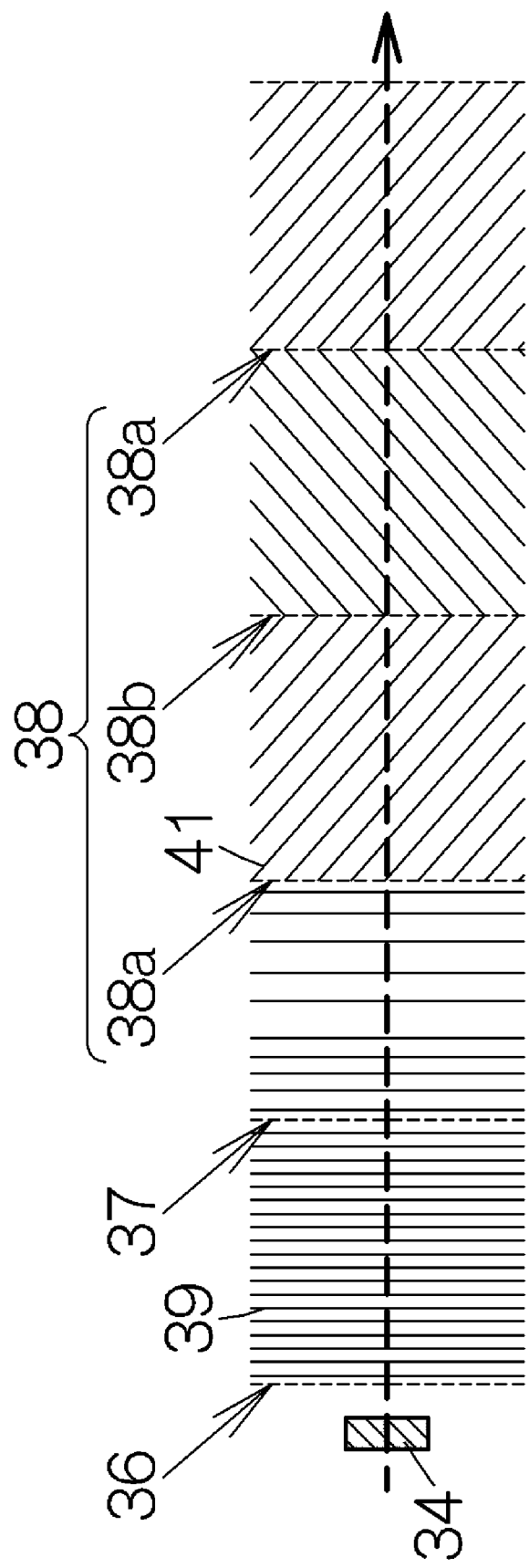
FIG. 4 is an enlarged partial plan view schematically illustrating a servo sector area according to a first embodiment.

FIG. 4 depicts the servo sector area 28 according to a first embodiment. The servo sector area 28 includes a preamble section 36, a servo mark address section 37 and a phase burst section 38 arranged in this sequence from the upstream end in the direction of the movement of the read element 34. Stripes of magnetic patterns 39 are established in the preamble section 36, for example. The magnetic patterns 39 extend on the radial lines of the magnetic recording disk 14, respectively, for example. The magnetic patterns 39 are arranged at regular intervals in the circumferential direction of the magnetic recording disk 14. The preamble section 36 serves to reliably establish the synchronization of signals read out of the read element 34. Simultaneously, the signals read out of the read element 34 are utilized to adjust the gain. Here, the terms "upstream" and "downstream" are defined based on the direction of movement of the flying head slider 22 during the rotation of the magnetic recording disk 14.

The servo mark address section 37 has magnetic dots arranged in a predetermined pattern. The arrangement of the magnetic dots reflects the sector number and the track number. Simultaneously, stripes of magnetic patterns are established in the servo mark address section 37. The magnetic patterns extend on the radial lines of the magnetic recording disk 14, respectively. The magnetic patterns serve to determine a servo clock signal. Phase is determined based on the servo clock signal. The phase will be described later. The servo mark address section 37 serves to identify the sector number and the track number. Simultaneously, the preamble section 36 and the servo mark address section 37 serve to identify the reference timing of the phase.

Stripes of magnetic patterns, namely phase burst lines 41, are established in the phase burst section 38. The phase burst lines 41 are inclined from the radial line of the magnetic recording disk 14 by a predetermined inclination angle. The phase burst section 38 includes even sections 38a and odd sections 38b alternately arranged in the circumferential direction of the magnetic recording disk 14. The even sections 38a and the odd sections 38b are utilized in pairs. The larger amount the read element 34 shifts inward in the radial direction, the earlier phase is detected at the read element 34 passing over the phase burst lines 41 in the even sections 38a. The larger amount the read element 34 shifts outward in the radial direction, the earlier phase is detected at the read element 34 passing over the phase burst lines 41 in the odd sections 38b.

Figure 5:
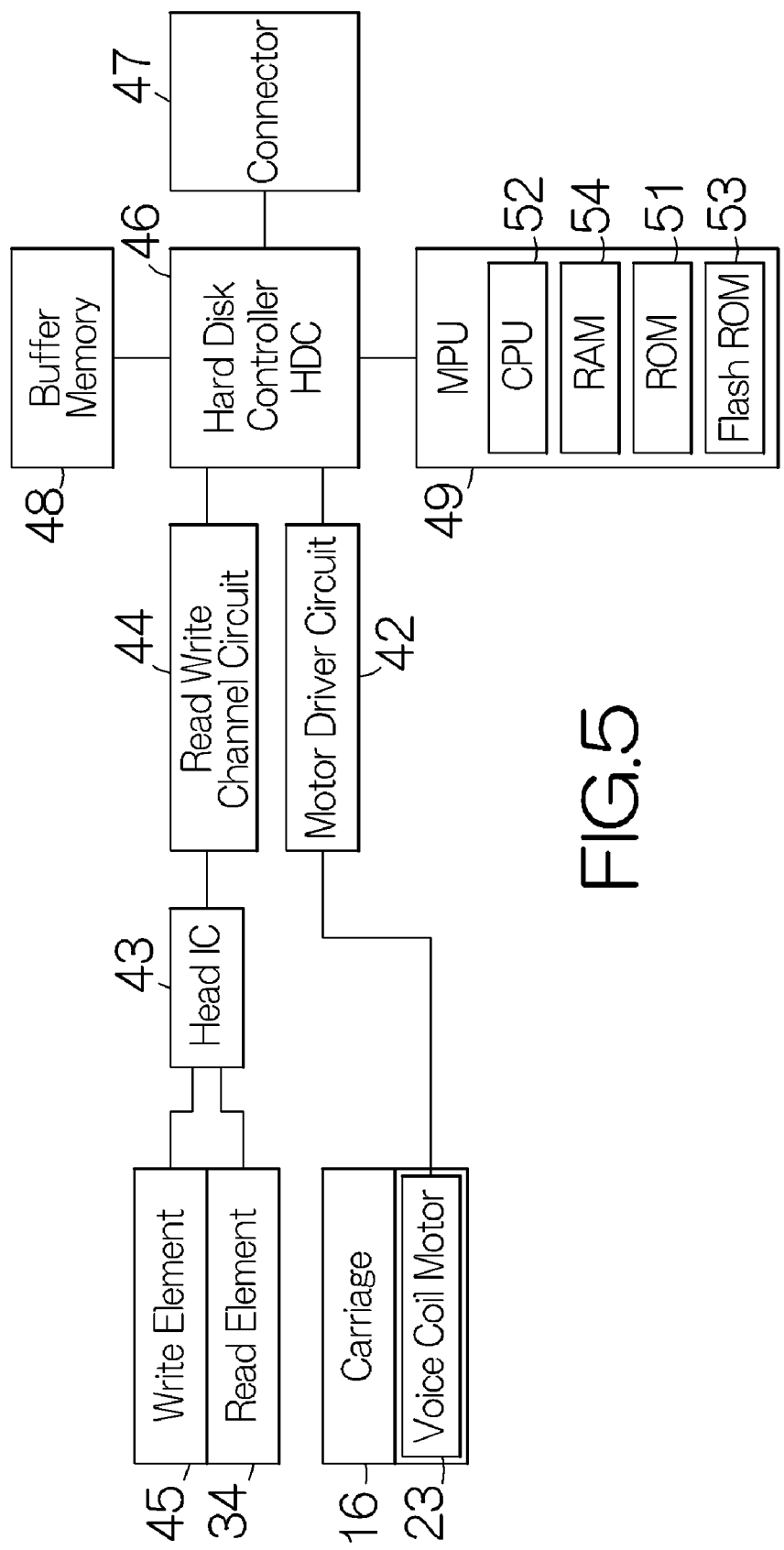
FIG. 5 is a block diagram schematically illustrating a control system of the hard disk drive.

As depicted in FIG. 5, a motor driver circuit 42 is connected to the voice coil motor 23. The motor driver circuit 42 is configured to supply a driving current to the voice coil motor 23. The supplied amount of the driving current serves to specify the movement amount of the voice coil motor 23. The movement amount is determined based on the rotation amount (rotation angle) of the carriage block 17.

A read write channel circuit (RDC) 44 is connected to a head IC (integrated circuit) 43. The read write channel circuit 44 modulates and demodulates signals in accordance with a designated modulation and demodulation pattern. The modulated signal, namely a write signal, is supplied to the head IC 43. The head IC 43 amplifies the write signal. The amplified write signal is supplied to the write element 45. The head IC 43 amplifies a read signal output from the read element 34. The amplified read signal is then supplied to the read write channel circuit 44. The read write channel circuit 44 demodulates the read signal.

A hard disk controller (HDC) 46 is connected to the motor driver circuit 42 and the read write channel circuit 44. The HDC 46 supplies a control signal to the motor driver circuit 42. The control signal serves to control the output from the motor driver circuit 42, namely a driving current. The HDC 46 likewise supplies an unmodulated write signal to the read write channel circuit 44 and receives a demodulated read signal supplied from the read write channel circuit 44. The HDC 46 may generate the unmodulated write signal based on data transmitted from a host computer, for example. The data may be supplied to the HDC 46 through a connector 47. The connector 47 may receive a control signal cable and a power supply cable, both not illustrated, extending from a main board incorporated in the host computer, for example. Likewise, the HDC 46 reproduces the data based on the demodulated read signal. The reproduced data may be output to the host computer through the connector 47. The HDC 46 may utilize a buffer memory 48 for the transmission and reception of data, for example. The buffer memory 48 temporarily stores data. A synchronous dynamic random access memory (SDRAM) may be employed as the buffer memory 48, for example.

A microprocessor unit (MPU) 49 is connected to the HDC 46. The MPU 49 includes a central processing unit (CPU) 52, for example. The CPU 52 operates based on a program held in a read only memory (ROM) 51, for example. The CPU 52 obtains data from a flash ROM 53 to operate, for example. The program and the data can temporarily be stored in a random access memory (RAM) 54, for example. The ROM 51, the flash ROM 53 and the RAM 54 may directly be connected to the CPU 52.

The read element 34 of the electromagnetic transducer keeps following the recording track based on a so-called tracking servo control. The tracking servo control utilizes a positional signal read out from the read element 34 based on a servo pattern on the magnetic recording disk 14. The positional signal is amplified at the head IC 43. The amplified positional signal is then supplied to the HDC 46 from the read write channel circuit 44. The HDC 46 determines a control amount of the voice coil motor 23 based on the supplied positional signal. The motor driver circuit 42 supplies a driving current to the voice coil motor 23 based on a control signal supplied from the HDC 46.

Figure 6:
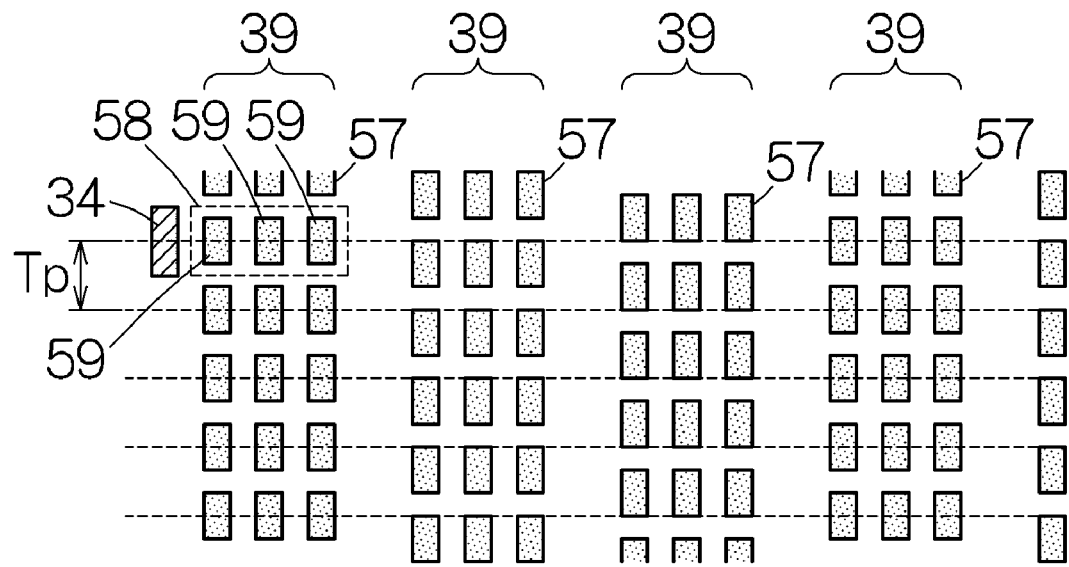
FIG. 6 is an enlarged partial plan view schematically illustrating a preamble section.

As depicted in FIG. 6, the individual magnetic pattern 39 in the preamble section 36 includes magnetic bodies 57 placed in the nonmagnetic body. The magnetic bodies 57 are arranged in a predetermined repetitive pattern repeated in the radial direction. The repetitive pattern has a unit pattern 58 made of consecutive three magnetic dots 59 arranged in the circumferential direction. The individual magnetic dot 59 corresponds to consecutive two of the unit blocks 33 adjacent to each other in the radial direction in the same manner as described above. The individual unit pattern 58 defines the interval equal to one unit block 33 between the adjacent magnetic dots 59 in the circumferential direction of the magnetic recording disk 14. Likewise, the interval equal to one unit block 33 is established between the adjacent unit patterns 58 in the radial direction of the magnetic recording disk 14. The magnetization of the upward direction (north pole) is established in the individual magnetic dot 59, for example. The interval equal to one unit pattern 58, namely three unit blocks 33, is established between the adjacent magnetic patterns 39, for example. Moreover, the preamble section 36 allows the phases of the repetitive patterns to shift between the adjacent magnetic patterns 39 in the radial direction by the amount equal to one unit block 33, namely one third the track pitch Tp. Here, the interval equal to the track pitch Tp is covered with consecutive three beam spots arranged in the radial direction based on electron beam lithography. In other words, an electron beam is irradiated three times to form the interval equal to the track pitch Tp. Specifically, an electron beam is irradiated twice in the redial direction over the extent of consecutive two unit blocks 33 so that the magnetic bodies are left at the irradiated spots in the subsequent process. Simultaneously, the irradiation of an electron beam is held over the next one unit block 33 so that the magnetic bodies are eliminated from the corresponding spot in the subsequent process. In this manner, one cycle is established every predetermined number, namely three, of the magnetic patterns 39. The total number of the magnetic patterns 39 in one preamble section 36 is set at an integral multiple of the predetermined number (a multiple of three in this case).

Figure 7:
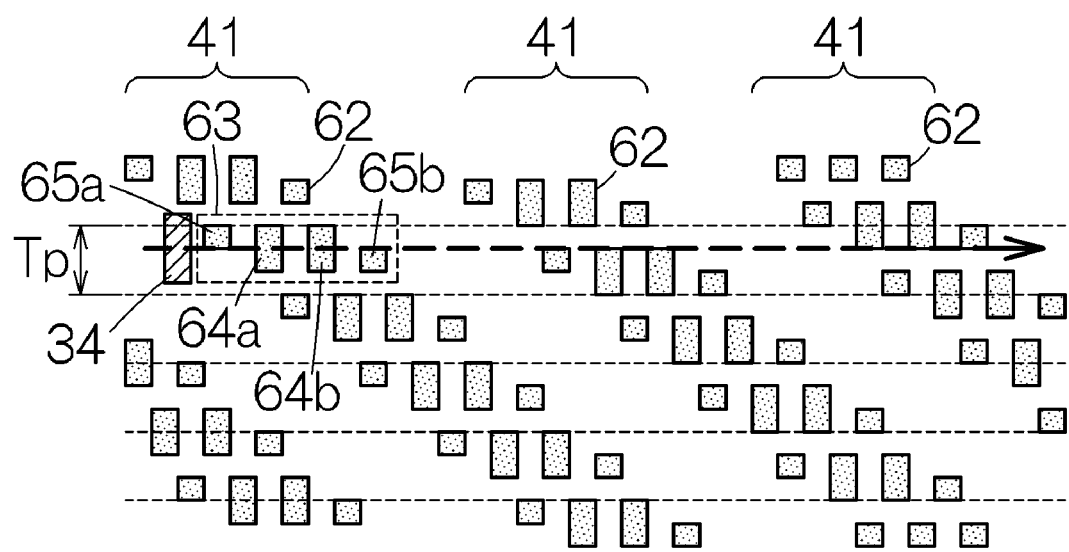
FIG. 7 is an enlarged partial plan view schematically illustrating an even section of a phase burst section.

As depicted in FIG. 7, the individual phase burst line 41 in the even section 38a of the phase burst section 38 includes magnetic bodies 62 placed in the nonmagnetic body. The magnetic bodies 62 are arranged in a repetitive pattern repeated in the radial direction. The repetitive pattern has a unit pattern 63 including consecutive two magnetic dots 64a, 64b arranged in the circumferential direction. The individual magnetic dots 64a, 64b are covered with consecutive two of the unit blocks 33 adjacent to each other in the radial direction in the same manner as described above. The unit pattern 63 includes one magnetic dot 65a placed upstream of the upstream magnetic dot 64a. The magnetic dot 65a is covered with one unit block 33. The interval equal to one unit block 33 is established between the magnetic dot 65a and the upstream magnetic dot 64a in the circumferential direction. The inner end of the magnetic dot 65a, namely the innermost contour of the magnetic dot 65a, is aligned with the inner ends of the magnetic dots 64a, 64b, namely the innermost contours of the magnetic dots 64a, 64b. In other words, the inner end of the magnetic dot 65a and the inner ends of the magnetic dots 64a, 64b are set on a common circumferential line. Likewise, one magnetic dot 65b is placed downstream of the downstream magnetic dot 64b. The magnetic dot 65b is covered with one unit block 33. The interval equal to one unit block 33 is established between the magnetic dot 65b and the downstream magnetic dot 64a in the circumferential direction. The outer end of the magnetic dot 65b, namely the outermost contour of the magnetic dot 65b, is aligned with the outer ends of the magnetic dots 64a, 64b, namely the outermost contours of the magnetic dots 64a, 64b. In other words, the outer end of the magnetic dot 65b and the outer ends of the magnetic dots 64a, 64b are set on a common circumferential line. The magnetization of the upward direction (north pole) is established in the magnetic dots 64a, 64b and the magnetic dots 65a, 65b, for example. The interval equal to six unit blocks 33 is established between the adjacent phase burst lines 41, for example. Moreover, the phase burst section 38 allows the phases of the repetitive pattern to shift between the adjacent phase burst lines 41 in the radial direction by the amount equal to one unit block 33, namely one third the track pitch Tp. Here, the interval equal to the track pitch Tp is covered with consecutive three beam spots arranged in the radial direction based on electron beam lithography. In other words, an electron beam is irradiated three times to form the interval equal to the track pitch Tp. Specifically, an electron beam is irradiated twice in the redial direction over the extent of consecutive two unit blocks 33 so that the magnetic bodies are left at the irradiated spots in the subsequent process. Simultaneously, the irradiation of an electron beam is held over the next one unit block 33 so that the magnetic bodies are eliminated from the corresponding spot in the subsequent process. In this manner, one cycle is established every predetermined number, namely three, of the phase burst lines 41. The total number of the phase burst lines 41 in one even section 38a of the phase burst section 38 is set at an integral multiple of the predetermined number (a multiple of three in this case).

Figure 8:
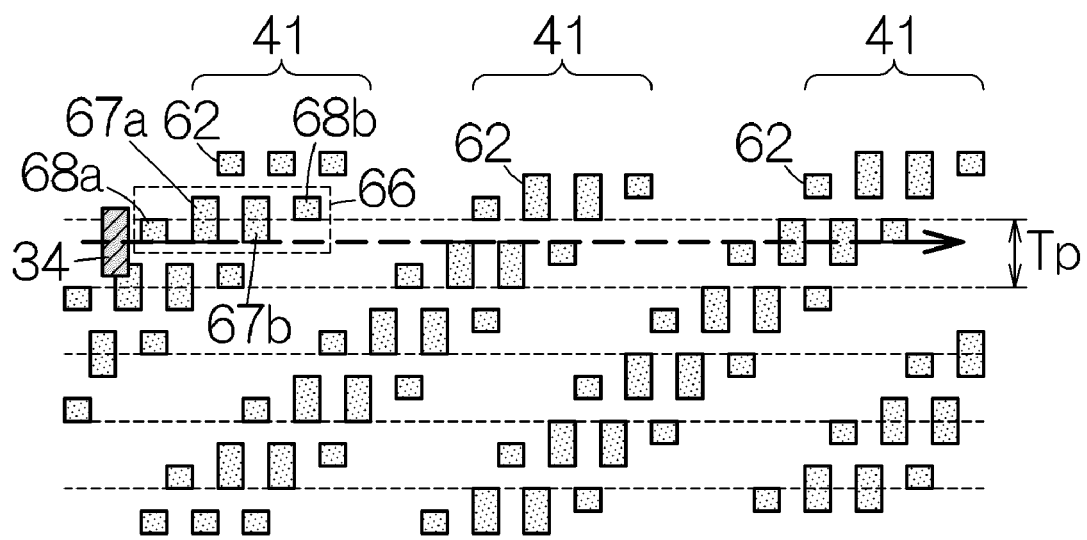
FIG. 8 is an enlarged partial plan view schematically illustrating an odd section of the phase burst section.

As is apparent from FIG. 8, the odd section 38b of the phase burst section 38 is formed in the same manner as the even section 38a. It should be noted that the repetitive pattern has one unit pattern 66 including consecutive two magnetic dots 67a, 67b arranged in the circumferential direction. The individual magnetic dots 67a, 67b are covered with consecutive two of the unit blocks 33 adjacent to each other in the radial direction in the same manner as described above. The unit pattern 66 includes one magnetic dot 68a placed upstream of the upstream magnetic dot 67a. The magnetic dot 68a is covered with one unit block 33. The interval equal to one unit block 33 is established between the magnetic dot 68a and the upstream magnetic dot 67a in the circumferential direction. The outer end of the magnetic dot 68a, namely the outermost contour of the magnetic dot 68a, is aligned with the outer ends of the magnetic dots 67a, 67b, namely the outermost contour of the magnetic dots 67a, 67b. In other words, the outer end of the magnetic dot 68a and the outer ends of the magnetic dots 67a, 67b are set on a common circumferential line. Likewise, one magnetic dot 68b is placed downstream of the downstream magnetic dot 67b. The magnetic dot 68b is covered with one unit block 33. The interval equal to one unit block 33 is established between the magnetic dot 68b and the downstream magnetic dot 67b in the circumferential direction. The inner end of the magnetic dot 68b, namely the innermost contour of the magnetic dot 68b, is aligned with the inner ends of the magnetic dots 67a, 67b, namely the innermost contours of the magnetic dots 67a, 67b. In other words, the inner end of the magnetic dot 68b and the inner ends of the magnetic dots 67a, 67b are set on a common circumferential line. The magnetization of the upward direction (north pole) is established in the magnetic dots 67a, 67b and the magnetic dots 68a, 68b, for example.

Figure 9:
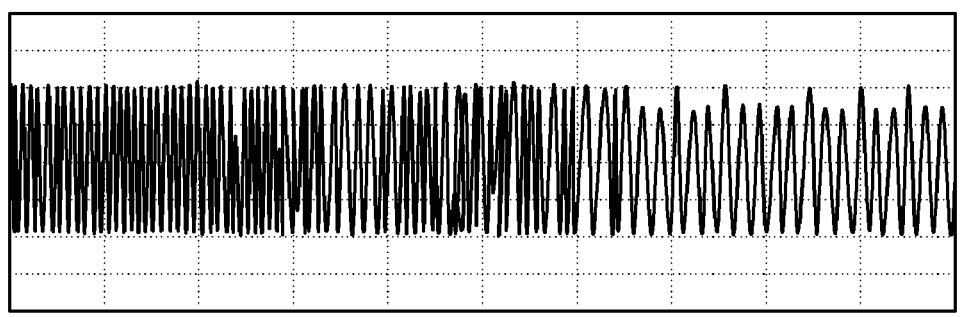
FIG. 9 is a graph showing the signal waveform of a signal output from the read element of an electromagnetic transducer.
Figure 10:
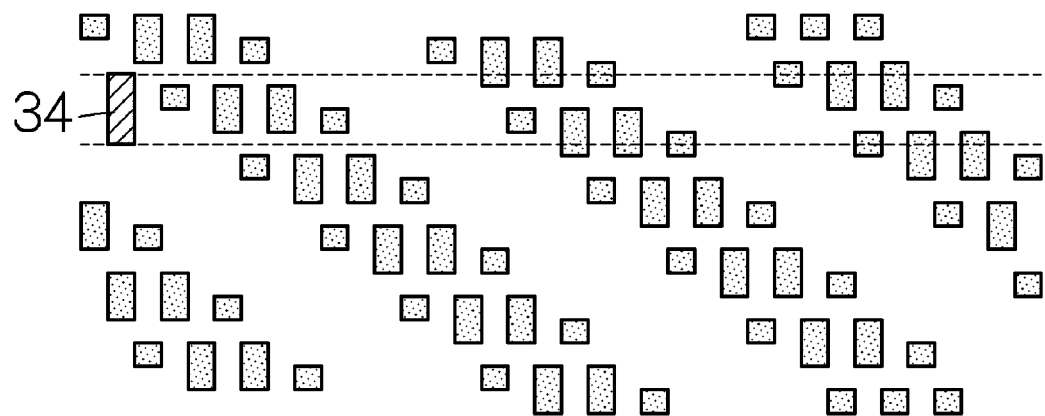
FIG. 10 is an enlarged partial plan view schematically illustrating the relationship between the radial position of the read element and the gain of the output signal.
Figure 11:
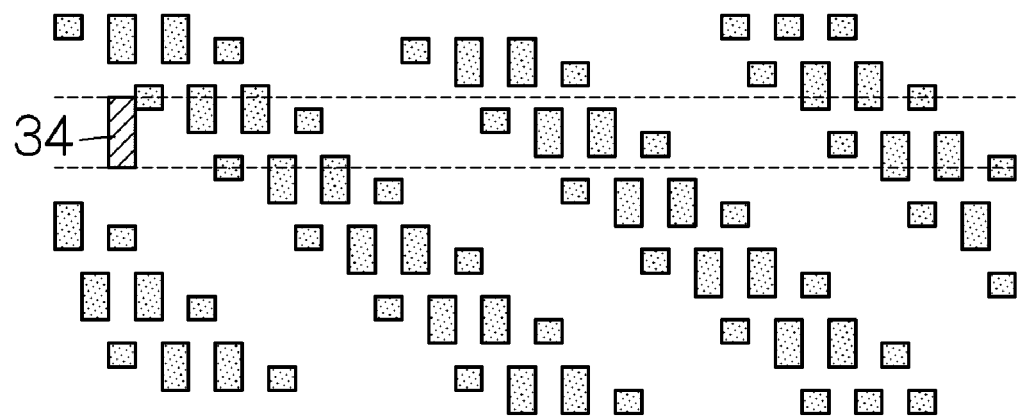
FIG. 11 is an enlarged partial plan view schematically illustrating the relationship between the radial position of the read element and the gain of the output signal.
Figure 12:
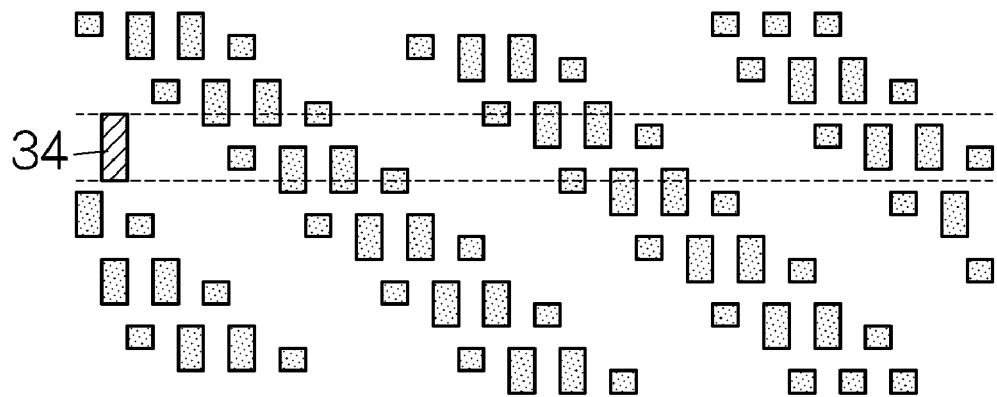
FIG. 12 is an enlarged partial plan view schematically illustrating the relationship between the radial position of the read element and the gain of the output signal.

The tracking servo control allows the read element 34 of the electromagnetic transducer to output signals, as depicted in FIG. 9, when the read element 34 passes over the preamble section 36, the servo mark address section 37 and the phase burst section 38 in this sequence. When the read element 34 passes over the preamble section 36, the RDC 44 generates a servo clock signal. Subsequently when the read element 34 passes over the phase burst section 38, the RDC 44 obtains the signal waveform based on each of the even sections 38a and the odd sections 38b. The RDC 44 performs averaging of the signal waveform based on the fast Fourier transform. The RDC 44 calculates the phase difference between the servo clock signal and the signal waveform for each of the even sections 38a and the odd sections 38b. The RDC 44 outputs a positional difference signal based on the calculated phase difference. The positional difference signal is supplied to the voice coil motor 23 as a control signal. The signal waveform is always kept at a predetermined gain at the preamble section 36, the servo mark address section 37 and the phase burst section 38. As a result, the electromagnetic transducer is allowed to reliably follow the target recording track 31. In particular, even if the read element 34 shifts in the radial direction of the magnetic recording disk 14 as depicted in FIGS. 10-12, the predetermined gain is ensured at the phase burst section 38 as depicted in FIG. 9. Since the phases of the repetitive patterns are shifted between the adjacent phase burst lines 41 in the radial direction by a fraction (n/m; n and m are a natural number) of the track pitch Tp, the signal waveform changes in an identical pattern in any of the recording tracks 31. This results in simplification of calculation of the positional difference signal. Even though the phases of the repetitive patterns are shifted between the adjacent phase burst lines 41 in the radial direction by an integral multiple of the track pitch Tp, identical advantages are obtained. Since the total number of the phase burst lines 41 in one even section 38a or one odd section 38b is set at an integral multiple of the predetermined number, averaging of the signal waveform is accurately performed. An error resulting from the averaging can be eliminated.

Figure 13:
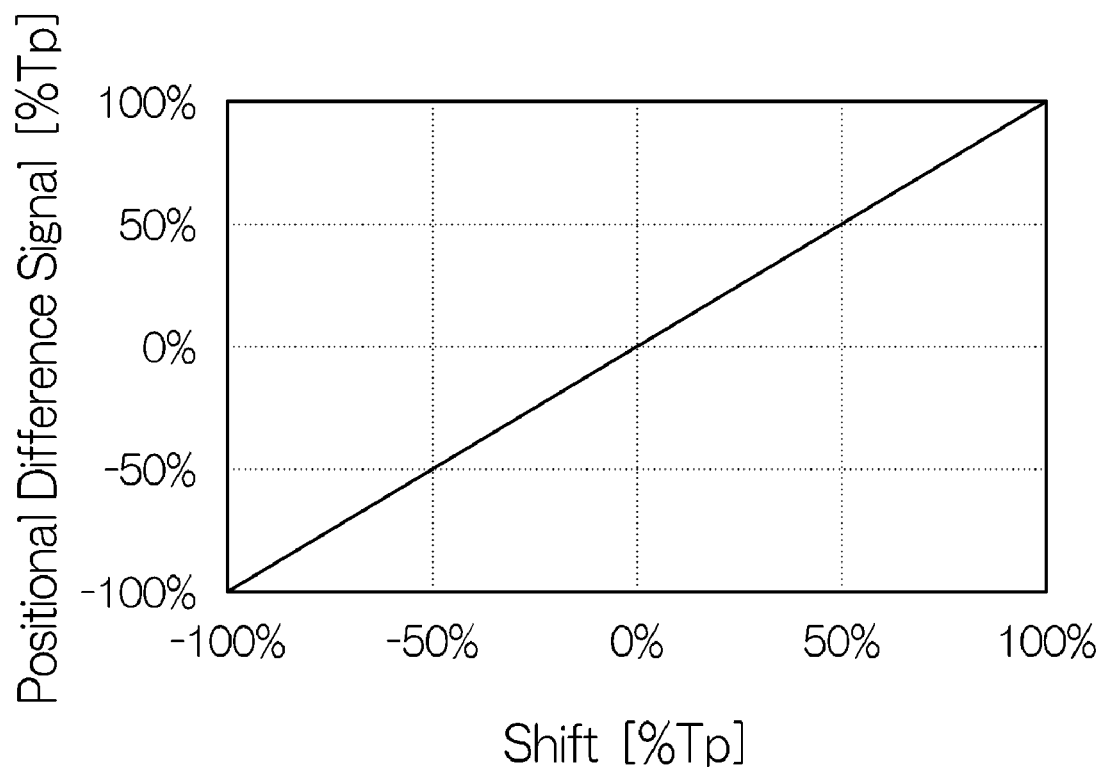
FIG. 13 is a graph depicting the relationship between the positional difference signal and the shift of the electromagnetic transducer.
Figure 14:
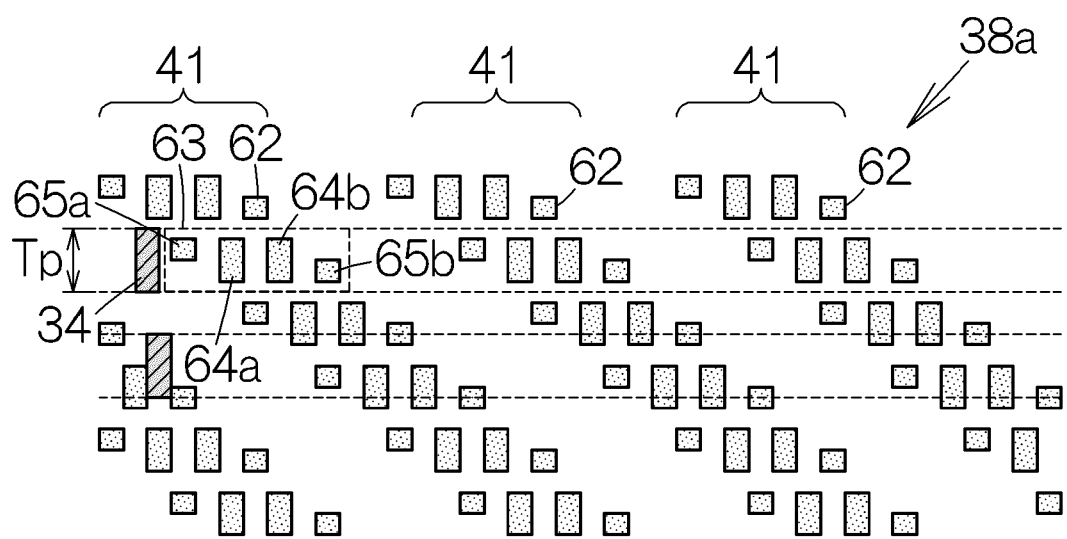
FIG. 14 is an enlarged partial plan view schematically illustrating the odd section of a phase burst section according to a comparative example.

The inventor performed a computer simulation based on the aforementioned phase burst section 38. The simulation was utilized to calculate the relationship between a positional difference signal and the shift of the electromagnetic transducer. As depicted in FIG. 13, a linear correlation has been confirmed between the positional difference signal and the movement of the electromagnetic transducer. It has thus been confirmed that the aforementioned phase burst sections 38 realizes an accurate positioning of the electromagnetic transducer.

Figure 15:
FIG. 15 is a graph showing the signal waveform of a signal output from the read element of an electromagnetic transducer.
Figure 16:
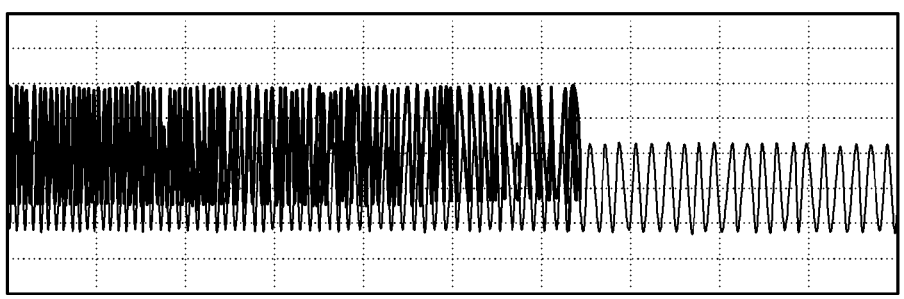
FIG. 16 is a graph showing the signal waveform of a signal output from the read element of an electromagnetic transducer.
Figure 17:
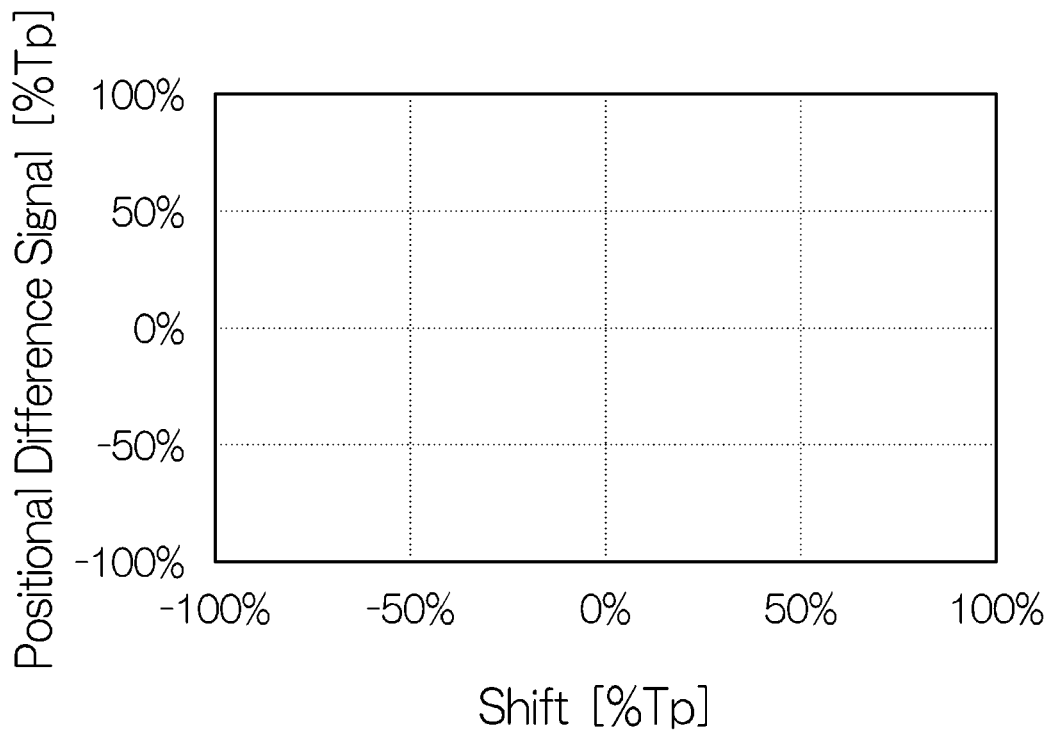
FIG. 17 is a graph depicting the relationship between the positional difference signal and the shift of the electromagnetic transducer.

The inventor also performed a computer simulation on a phase burst section according to a comparative example. The phase burst sections 38a according to a comparative example include the phase burst lines 41 having the magnetic bodies 62 arranged in the nonmagnetic body in a predetermined repetitive pattern repeated in the radial direction. One unit pattern 66 of the repetitive pattern is formed in the same manner as in the aforementioned phase burst lines 41. The phases of the repetitive patterns synchronize in the radial direction of the magnetic recording disk 14 between the adjacent phase burst lines 41 of this phase burst section 38a. As a result, when the centerline of the read element 34 is set on the circumferential line at the centerlines of the magnetic dots 64a, 64b, the signal waveform is kept at a sufficient gain as depicted in FIG. 15. When the centerline of the read element 34 shifts to the intermediate position between the unit patterns 63, the gain of the signal waveform significantly drops. As a result, distortion has been observed in the correlation between the positional difference signal and the shift of the electromagnetic transducer, as depicted in FIG. 17. The phase burst section 38a of this type cannot achieve an accurate positioning of the electromagnetic transducer.

Figure 18:
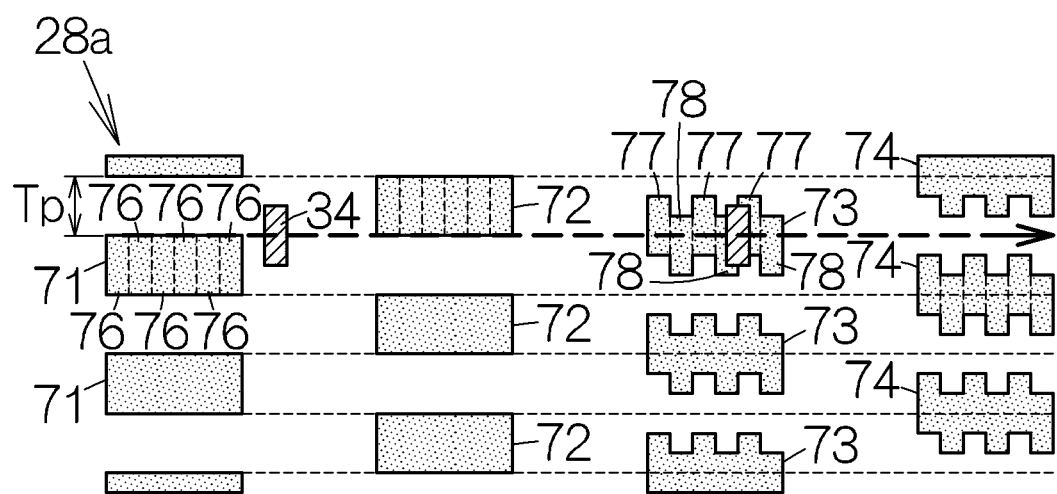
FIG. 18 is an enlarged partial plan view schematically illustrating a servo sector area according to a second embodiment.

FIG. 18 depicts a servo sector area 28a according to a second embodiment. The second embodiment utilizes the servo sector area 28a for an amplitude control servo in place of the aforementioned servo sector area 28 for a phase control servo. The servo sector area 28a includes first magnetic areas 71, second magnetic areas 72, third magnetic areas 73 and fourth magnetic areas 74. The individual first magnetic area 71 is made of consecutive six unit magnetic bodies 76 united with one another in the circumferential direction. The individual unit magnetic body 76 is covered with consecutive three of the unit blocks 33 united with one another in the radial direction. The first magnetic areas 71 are arranged in the radial direction at predetermined intervals. Here, the interval equal to three unit blocks 33 is established between the adjacent first magnetic areas 71 in the radial direction. The individual second magnetic area 72 is likewise made of consecutive six unit magnetic bodies 76 united with one another in the circumferential direction. The second magnetic areas 72 and the first magnetic areas 71 are staggered in the radial direction. When the centerline of the read element 34 follows the centerline of the recording track 31, the amplitude of output based on the first magnetic areas 71 coincides with that of output based on the second magnetic areas 72. The voice coil motor 23 is controlled based on the coincidence of the amplitudes. A tracking servo control is in this manner realized.

The individual third magnetic area 73 is made of consecutive six unit magnetic bodies 76 united with one another in the circumferential direction. The n:th (n=even number) unit magnetic bodies 76, namely the second magnetic blocks 78 shifts in the radial direction by one unit block 33 from the n:th (n=odd number) unit magnetic bodies 76, namely the first magnetic blocks 77. The first magnetic blocks 77 and the second magnetic blocks 78 are thus alternately arranged in series in the circumferential direction. The fourth magnetic areas 74 are formed in the same manner as the third magnetic areas 73. It should be noted that the fourth magnetic areas 74 and the third magnetic areas 73 are staggered in the radial direction.

Assume that the read element 34 of the electromagnetic transducer passes over the third magnetic area 73 and the fourth magnetic area 74 during the tracking servo control. As long as the centerline of the read element 34 coincides with the centerline of the recording track, the read element 34 is allowed to output a signal similar to the signal generated at the read element 34 following the centerlines of the first magnetic area 71 and the second magnetic area 72. If the read element 34 passes over the edges of the third magnetic area 73 and the fourth magnetic area 74 in the circumferential direction, a high frequency component is superposed on the reproduction signal output from the read element 34 under the influence of the magnetic bodies alternately arranged. The reproduction signal may be averaged in each of the magnetic areas 73, 74. The frequency component is calculated in the averaged reproduction signal based on the discrete Fourier transform. Simultaneously, the amplitude of the averaged reproduction signal is extracted. The influence of the high frequency component is in this manner reduced. A stabilized tracking servo control can thus be obtained.

Here, the interval equal to the track pitch Tp is covered with consecutive three beam spots arranged in the radial direction based on electron beam lithography. In other words, an electron beam is irradiated three times to form the interval equal to the track pitch Tp. The amplitude control servo requires magnetic areas, subsequent to the first and second magnetic areas 71, 72, having the centerlines aligned with the centerline of the recording track. In the case where N (=odd number) times irradiation of an electron beam is utilized to establish the track pitch Tp as mentioned above, it is not possible to form an beam spot tangent to the centerline of the recording track. If the third magnetic areas 73 and the fourth magnetic areas 74 are contoured to have the shape identical to that of the first magnetic areas 71 and the second magnetic areas 72, it is impossible to establish the edges of the third magnetic areas 73 and the fourth magnetic areas 74 in the circumferential direction. In the case where the third magnetic areas 73 and the fourth magnetic areas 74 are made of the alternate arrangement of the first magnetic blocks 77 and the second magnetic blocks 78 as mentioned in the present embodiment, the third magnetic areas 73 and the fourth magnetic areas 74 are reliably established even though N (=odd number) times irradiation of an electron beam is utilized to establish the track pitch Tp.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A magnetic storage medium comprising:
servo regions comprising burst lines, each of the burst lines comprising a plurality of sets of magnetic dots placed in a nonmagnetic body in a predetermined repetitive pattern repeated in a radial direction, the sets of magnetic dots of adjacent burst lines being at predetermined intervals in a circumferential direction, a track pitch of the magnetic storage medium being set at an integral multiple of a width in the radial direction of a unit block of the magnetic dots, wherein
phases of arrangements, relative to a circumferential line, of the sets of magnetic dots of at least adjacent burst lines are shifted with respect to each other in the radial direction.

2. The magnetic storage medium according to claim 1, wherein an amount of shift of the phases is set at a predetermined number multiple of the width of the unit block or a predetermined number multiple of the track pitch.

3. The magnetic storage medium according to claim 1, wherein the amount of shift of the phase is periodically set for groups of a predetermined number of the burst lines, a total number of the burst lines being set at an integral multiple of the predetermined number.

4. A storage apparatus comprising:
an enclosure;
a magnetic storage medium enclosed in the enclosure; and
a magnetic head opposed to a surface of the magnetic storage medium, wherein
the magnetic storage medium includes burst lines inclined from a radial line by a predetermined inclination angle, each of the burst lines comprising a plurality of sets of magnetic dots placed in a nonmagnetic body in a predetermined repetitive pattern repeated in a radial direction, the sets of magnetic dots of adjacent burst lines being arranged at predetermined intervals in a circumferential direction, a track pitch of the magnetic storage medium being set at an integral multiple of a width in the radial direction of a unit block of the magnetic, dots, phases of arrangements, relative to a circumferential line, of the sets of magnetic dots of at least adjacent burst lines being shifted with respect to each other in the radial direction.

5. The storage apparatus according to claim 4, wherein an amount of shift of the phases is set at a predetermined number multiple of the width of the unit block or a predetermined number multiple of the track pitch.

6. The storage apparatus according claim 4, wherein the amount of shift of the phase is periodically set for groups of a predetermined number of the burst lines, a total number of the burst lines being set at an integral multiple of the predetermined number.

7. A magnetic storage medium comprising:
servo regions comprising burst lines, each of the burst lines comprising a plurality of sets of magnetic dots placed in a nonmagnetic body in a predetermined repetitive pattern repeated in a radial direction;
a first magnetic block section made of a unit magnetic body contoured to have a predetermined shape in a nonmagnetic body; and
a second magnetic block section made of the unit magnetic body shifted from the first magnetic block section in a radial direction by a predetermined amount, wherein
the first magnetic block section and the second magnetic block section are alternately and sequentially arranged in a circumferential direction.

8. A storage apparatus comprising:
an enclosure;
the magnetic storage medium according to claim 7 enclosed in the enclosure; and
a magnetic head opposed to a surface of the magnetic storage medium.

* * * * *

UNITED STATES PATENT AND TRADEMARK OFFICE
CERTIFICATE OF CORRECTION

PATENT NO. : 8,098,453 B2  
APPLICATION NO. : 12/488082  
DATED : January 17, 2012  
INVENTOR(S) : Shibano Page 1 of 1

It is certified that error appears in the above-identified patent and that said Letters Patent is hereby corrected as shown below:

In the Claims

Col. 12, line 37          Delete "first magnetic block section" and insert  
Claim 7                   --first magnetic section-- in its place.

Col. 12, ll. 37-38        Delete "second magnetic block section" and insert  
Claim 7                   --second magnetic section-- in its place.

Signed and Sealed this  
Seventeenth Day of July, 2012

David J. Kappos  
*Director of the United States Patent and Trademark Office*